United States Patent [19]

Kurihara et al.

[11] Patent Number: 4,974,063

[45] Date of Patent: Nov. 27, 1990

[54] VIDEO SIGNAL PROCESSING DEVICE

[75] Inventors: Ikuo Kurihara; Rikitaroh Mita, both of Kanagawa, Japan

[73] Assignee: Canon Kabushiki Kaisha, Japan

[21] Appl. No.: 323,228

[22] Filed: Mar. 13, 1989

Related U.S. Application Data

[63] Continuation of Ser. No. 107,865, Oct. 7, 1987, abandoned, which is a continuation of Ser. No. 864,014, May 16, 1986, abandoned.

[30] Foreign Application Priority Data

May 24, 1985 [JP] Japan .................................. 60-111468

[51] Int. Cl.$^5$ ......................... H04N 11/22; H04N 9/88
[52] U.S. Cl. ...................................... 358/11; 358/314; 358/18
[58] Field of Search ...................... 358/11, 14, 18, 310, 358/313, 314

[56] References Cited

U.S. PATENT DOCUMENTS

| | | | |
|---|---|---|---|
| 4,400,720 | 8/1983 | Hinn ........................................ | 358/18 |
| 4,521,802 | 6/1985 | Ikeda ....................................... | 358/11 |
| 4,605,951 | 8/1986 | Kuribayashi ........................... | 358/11 |
| 4,623,914 | 11/1986 | Kuribayashi ........................... | 358/18 |

FOREIGN PATENT DOCUMENTS 2537816  6/1984  France .................................. 358/18

*Primary Examiner*—John W. Shepperd
*Attorney, Agent, or Firm*—Toren, McGeady & Associates

[57] ABSTRACT

In a device for processing a video signal including line sequential signals which have DC offset during a specific portion of every horizontal scanning period, the line sequential signal is rearranged into line concurrent signals on the basis of a level difference between the line sequential signals obtained during the specific portion of adjacent horizontal scanning periods.

11 Claims, 6 Drawing Sheets

F I G. 5
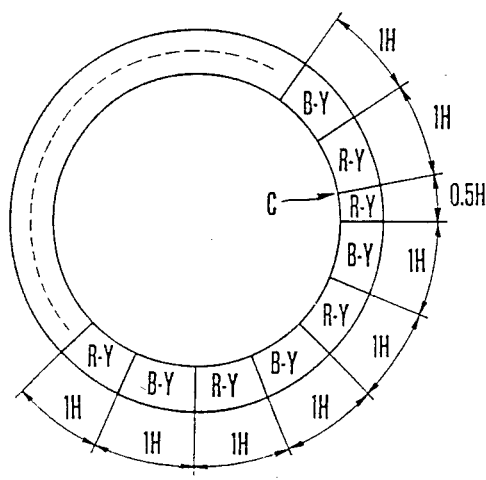
F I G. 6(a)
F I G. 6(b) | B-Y | R-Y | B-Y | R-Y | B-Y | R-Y | R-Y | B-Y | R-Y | B-Y | R-Y | B-Y |
F I G. 6(c) | R-Y | B-Y | R-Y | B-Y | R-Y | R-Y | B-Y | R-Y | B-Y | R-Y | B-Y |
F I G. 6(d) | B-Y | R-Y | B-Y | R-Y | B-Y | R-Y | B-Y | R-Y | B-Y | R-Y | B-Y |
SECOND FIELD | FIRST FIELD
F I G. 6(e) | R-Y | B-Y | R-Y | B-Y | R-Y | R-Y | R-Y | B-Y | R-Y | B-Y | R-Y |
FIRST FIELD | SECOND FIELD

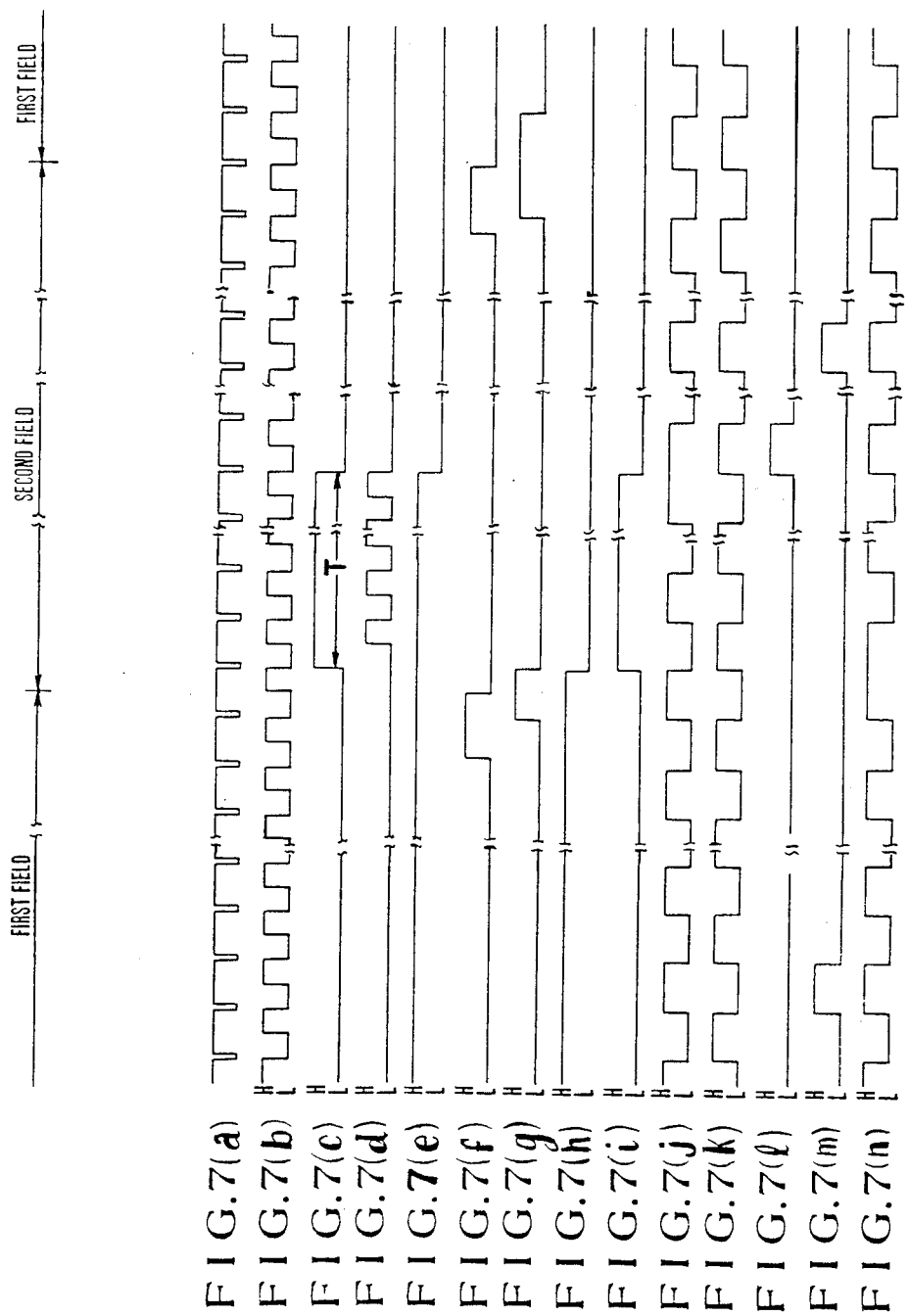

VIDEO SIGNAL PROCESSING DEVICE

This is a continuation application of Ser. No. 107,865, filed Oct. 7, 1987, which in turn is a continuation application of Ser. No. 864,014, filed May 16, 1986 now abandoned.

BACKGROUND OF THE INVENTION

1. Field of the Invention:

This invention relates to a video signal processing device, and, more particularly, to a video signal processing device highly suited for an apparatus arranged to process a video signal including line sequential signals which have an offset level, at least in part.

2. Description of the Related Art:

Generally, the process of rearranging line sequential signals into concurrent signals necessitates discrimination of the kind of the signals for every horizontal scanning period (hereinafter referred to as H period). Therefore, in recording or transmitting these signals, they are processed into some signal form that permits discrimination of their kinds. For example, in recording signals of two kinds by arranging them in a line sequential manner, the DC component (hereinafter referred to as DC) has an offset of a 2-H period.

In accordance with the conventional process for rearranging the DC offset line sequential signals of this kind into concurrent signals, the voltage of each H period is sampled and held during a portion of the H period within which the DC offset is detectable; and then the above-stated discrimination is accomplished by comparing the sampled voltage with a predetermined level. The line sequential signals are made concurrent on the basis of a discriminating signal thus obtained.

However, the conventional apparatus which is arranged to perform the above-stated process is required to detect the slight levels of the line sequential signals of two kinds and, accordingly, to have a circuit constant arranged to a high degree of precision. Besides, it is necessary also to adjust the circuit constant. Further, since a large number of capacitors must be used, the conventional arrangement has been not suited for integration of the circuit and thus hindered efforts to arrange the apparatus in a compact size.

SUMMARY OF THE INVENTION

In view of the above-stated problems of the prior art, it is a general object of this invention to provide a video signal processing device which is capable of adequately rearranging line sequential signals into concurrent signals with a simple arrangement.

More specifically, it is an object of this invention to provide a video signal processing device which is capable of reliably detecting a slight degree of DC offset.

Under this object, a video signal processing device, arranged to process a video signal including line sequential signals which have a DC offset during a specific portion, of every horizontal scanning period comprises: detecting means for detecting a level difference between the line sequential signals obtained during the specific portions of adjacent horizontal scanning periods; and arranging means for rearranging the line sequential signals into line concurrent signals on the basis of the detected level difference.

It is another object of this invention to provide a video signal processing device which is capable of forming a binary control signal for obtaining line concurrent signals with a simple arrangement.

Under that object, a video signal processing device, arranged, according to this invention, to process a video signal including line sequentially arranged signals of two kinds, comprises: detecting means for detecting at every two horizontal scanning periods the kind of the line sequential signal obtained during each horizontal scanning period; means for generating a binary signal on the basis of the detection output of the detecting means; means for generating a rectangular wave signal which reverses for every horizontal scanning period; control means for controlling the polarity of the rectangular wave signal on the basis of the binary signal; and arranging means for rearranging the line sequential signal into line concurrent signals on the basis of the rectangular wave signal which has the polarity thereof under the control of the control means.

It is a further object of this invention to provide a video signal processing device which is capable of obtaining stable line concurrent signals even in cases where the S/N ratio of the video signal is deteriorated.

Under that object, a video signal processing device, arranged, according to this invention, to process a video signal including line sequential signals, comprises: control signal generating means arranged to detect the kind of the line sequential signal, obtained during each horizontal scanning period and to generate a control signal; arranging means for rearranging the line sequential signals into line concurrent signals on the basis of the control signal; drop-out detecting means for detecting a drop-out of the video signal; and inhibiting means for inhibiting the control signal from changing, the inhibiting means being arranged to operate in response to the output of the drop-out detecting means.

These and further objects and features of this invention will become apparent from the following detailed description of a preferred embodiment thereof taken in connection with the accompanying drawings.

BRIEF DESCRIPTION OF THE DRAWING

FIG. 5 is a schematic illustration of the recording format on a magnetic sheet to be used for the embodiment shown in FIG. 3.

FIGS. 6(a) to 6(e) are illustrations showing a signal processing operation generally applicable to signal joining parts in the recording format shown in FIG. 5.

FIGS. 7(a) to 7(n) show, in a timing chart, the waveforms at various points in the circuits shown in FIG. 3.

Figure 1:
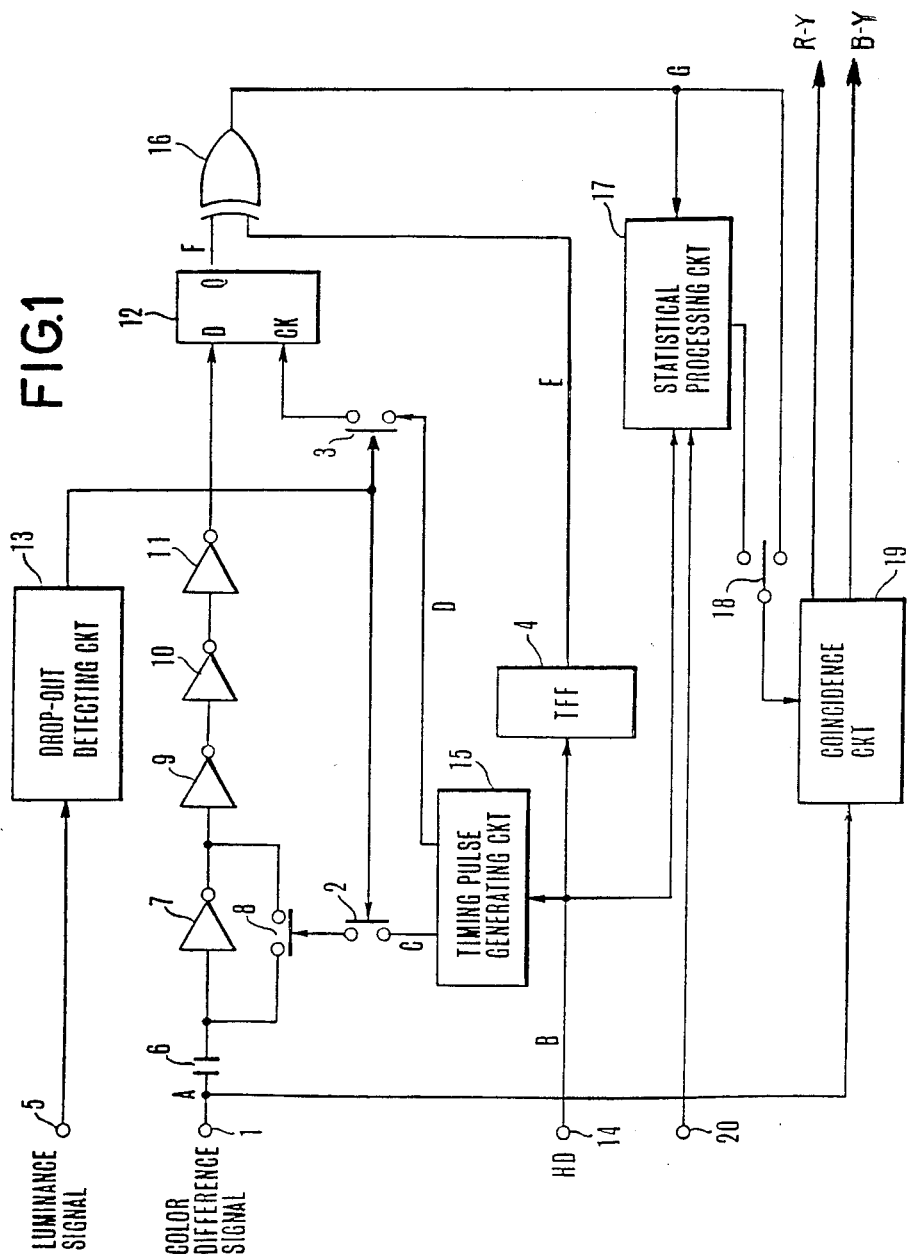
FIG. 1 is a diagram showing, in outline, the arrangement of a video signal processing device arranged according to this invention as an embodiment thereof.

DETAILED DESCRIPTION OF PREFERRED EMBODIMENTS:

Referring to FIG. 1 which shows a video signal processing device arranged as an embodiment of this invention, the illustration includes an input terminal 1 which is arranged to receive color difference line sequential signals included in a video signal; switches 2 and 3; a T type flip-flop 4 (hereinafter referred to as TFF); an input terminal 5 which is arranged to receive a luminance signal included in the video signal; a coupling capacitor 6; an inverter 7 for sampling and holding; an analog switch 8; inverters 9, 10 and 11 for amplification; a D type flip-flop 12 (hereinafter referred to as DFF); a drop-out detecting circuit 13; a terminal 14 which is arranged to receive a horizontal synchronizing signal (hereinafter referred to as HD signal) included in the video signal; a timing pulse generating circuit 15; an exclusive OR circuit 16 (hereinafter referred to as EXOR circuit); a statistical processing circuit 17; a switch 18; and a coincidence circuit 19.

Figure 2:
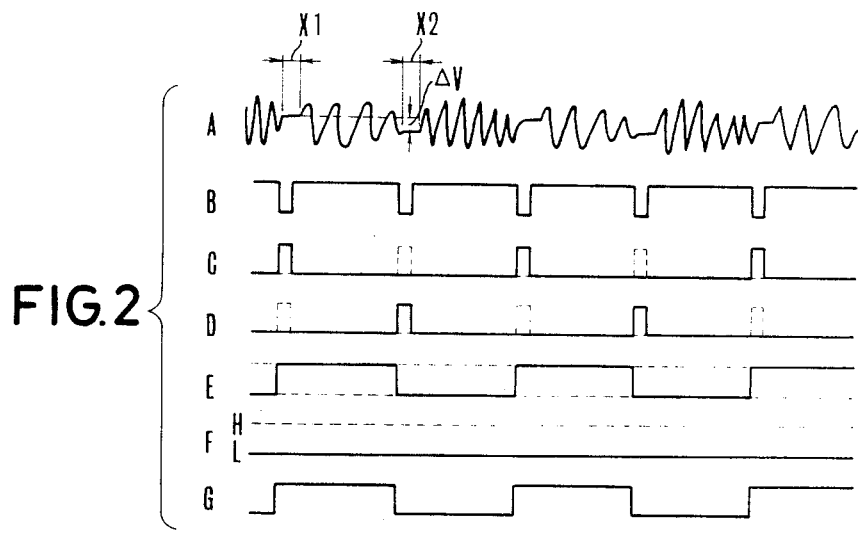
FIG. 2 is a timing chart showing the output waveforms of various parts of FIG. 1.

Referring to FIG. 2 which is a timing chart showing the output waveforms of various parts of FIG. 1, the signal applied to the input terminal 1 is of a waveform as shown at a part A. Concurrently with the arrival of this input at the terminal 1, the timing pulse generating circuit 15 generates pulses of a 2-H period as shown at parts C and D of FIG. 2 according to the HD signal applied to the terminal 14 as shown at a part B of FIG. 2. The pulse signal C turns on the analog switch 8 to short circuit the input and output terminals of the inverter 7 for every 2-H period. As a result, the level of the color difference line sequential signals obtained during an offset discriminating period X1 indicated in FIG. 2 is kept at the capacitor 6 as a reference voltage. During the discriminating period X2 in the next line the level thereof is either higher or lower than the reference voltage by the offset level $\alpha V$.

After setting the reference voltage, the level of a difference between the color difference signal and the reference voltage is amplified up to a logical level through the inverters 9 to 11. The amplified level difference is supplied to the D input terminal of the DFF 12 in the form of a binary signal at either a high level (Hi) or a low level (Lo). In this instance, the pulse D is generated in synchronism with the discriminating period X2. Therefore, the Q output of the DFF 12 becomes a signal obtained by amplifying a difference between the level obtained during the discriminating period X1 and the level obtained during another discriminating period X2 up to the logical level of Hi or Lo.

Meanwhile, the HD signal is supplied to the TFF 4. The TFF 4 then produces a rectangular wave signal of a 2-H period as shown at a part E of FIG. 2. If the color difference line sequential signals are received in a prescribed order, the Q output of the DFF 12 is always at either a high level or a low level. The EXOR circuit 16 then produces the rectangular wave pulse of the 2-H period either as it is or by inverting it. The output of the EXOR 16 becomes a so-called line discrimination signal G. In FIG. 2, the waveform indicated by broken lines differs by one H period in phase from the waveform indicated by full lines.

Figure 3:
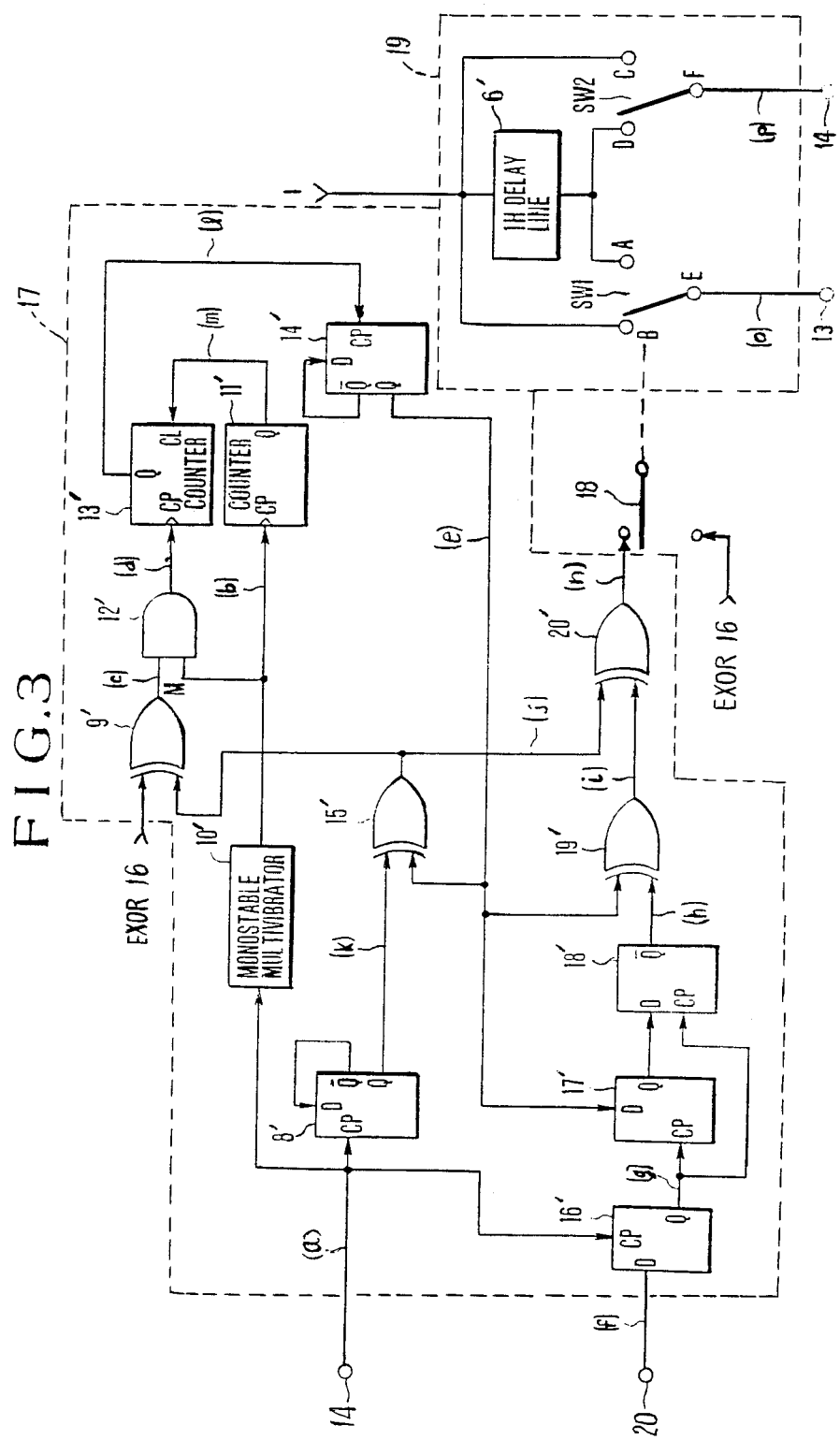
FIG. 3 is a diagram showing the arrangement of the essential parts of a statistical processing circuit and a coincidence circuit in the device of FIG. 1.
Figure 4:
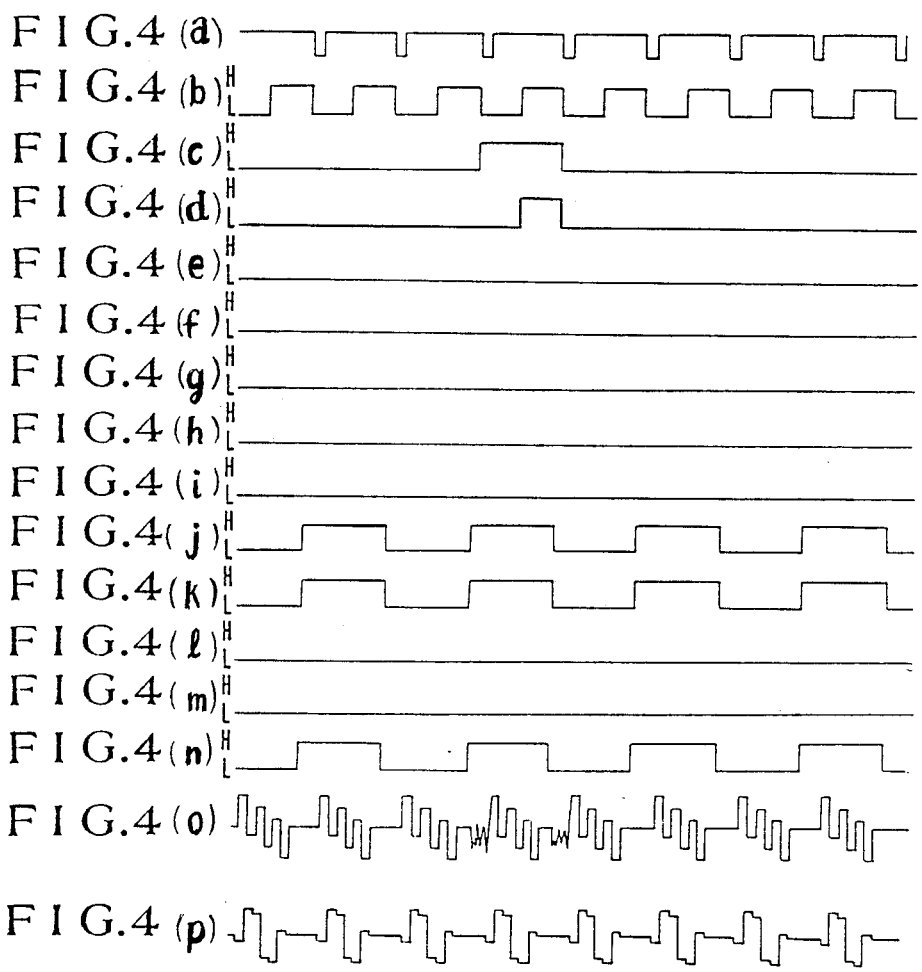
FIGS. 4(a) to 4(p) show, in a timing chart, the waveforms at various points in the circuits shown in FIG. 3.

The concurrent line rearranging process may be carried out by supplying the line discrimination signal thus obtained to the coincidence circuit 19 as it is. In the event of poor S/N ratio of the color difference line sequential signals, however, the offset either might not be found or might be inverted. It is, therefore, preferable to have these signals statistically processed for every one field period. Therefore, the above-stated discrimination signal G is supplied to the statistical processing circuit 17 together with the HD signal and another signal which represents a field period and comes via a terminal 20. This arrangement ensures that the rectangular wave of the 2-H period which permits accurate processing during one field period can be obtained without having it inverted before it is produced. The details of the statistical processing circuit 1 and the coincidence circuit 19 have been disclosed in Japanese Patent Applications No. SHO 59-144781 and No. SHO 59-156559 and U.S. Patent Application Serial No. 754,339 which have been all assigned to the assignee of this invention, and are described as follows:

FIG. 3 shows the essential arrangement of the statistical processing circuit 17 and the coincidence circuit 19. The statistical processing circuit 17 comprises a DFF 8' arranged to be triggered by the fall of a horizontal synchronizing signal (a) from terminal 14; an exclusive OR circuit 9' (hereinafter referred to as EXOR); a monostable multivibrator 10' arranged to be triggered by the fall of the incoming horizontal synchronizing signal; a counter 11' arranged to count the number of pulses of a signal produced from the monostable multivibrator 10' and to produce a Q output at a high level when a predetermined number (for example $2^8$) of pules have been counted; an AND gate 12' arranged to obtain a logical product of the signals produced from the EXOR 9' and the monostable multivibrator 10'; a counter 13' arranged to count the number of pulses of a signal produced from the AND gate 12', to produce a Q output at a high level when a predetermined number (for example $p2^7$) of pulses have been counted and to be reset by the Q output of the other counter 11'; a DFF 14' arranged to be triggered by the rise of a signal produced from the counter 13' and to have its output inverted thereby; an EXOR 15' arranged to produce the exclusive OR of the Q outputs of the DFF 8' and the DFF 14'; a DFF 16' arranged to receive as a data input a signal PG which comes from a terminal 20 in synchronism with the rotation of a magnetic sheet and to be triggered by the fall of the horizontal synchronizing signal (d); a DFF 17' arranged to be triggered by the fall of a signal produced from the DFF 16' and to receive the output signal of the DFF 14' as a data input; a DFF 18' which receives the output signal of the DFF 17' as a data input and is arranged to be triggered by the fall of the output of the DFF 16'; an EXOR 19' arranged to receive the outputs of the DFF's 14' and 18'; and an EXOR 20' arranged to receive signals produced from the EXOR's 15' and 19'. The connecting positions of the switches SW1 and SW2 are arranged to be changed by the output of the EXOR 20' acting through the switch 18. The coincidence circuit 19 includes the switches SW1 and SW2 and a 1H delay line 6'. FIGS. 4(a) to 4(p) show in a timing chart, the waveforms of the various points (a) to (p) indicated in FIG. 3. Referring now to FIGS. 4(a) to 4(p), each of the component elements of the apparatus shown in FIG. 3 operates as follows: FIG. 4(a) shows a horizontal synchronizing signal which is in phase synchronism with the horizontal synchronizing signal of a luminance signal (not shown). With this signal supplied, respectively, to the monostable multivibrator 10' and the DFF 8', signals are obtained as shown in FIGS. 4(b) and 4(k). It is well known that the input signal (a) is arranged to be separately compensated for any drop-out or the like that might arise in the horizontal synchronizing signal.

The output signal (k) of the DFF 8' is supplied to the EXOR 15'. The output signal of the EXOR 15', shown in FIG. 4(j), is supplied to the EXOR 20'. Then, with the level of the output signal (n) of the EXOR 20' changed over between a high level and a low level, the connecting positions of the switches SW1 and SW2 are also changed over in such a way as to give line simultaneous color difference signals. More specifically, the contact piece E of the switch SW1 is connected to one contact point A and the contact piece F of the switch SW2 to one contact point C when the output signal (q) of the EXOR 20' is at a high level. The contact piece E is connected to the other contact point B and the contact piece F to the other contact point D when the output signal (n) of the EXOR 20' is at a low level.

With the embodiment arranged in this manner, the phase of a change-over signal (n) for the change-over of the switches SW1 and SW2 never becomes discontinuous even in the event of deterioration of an S/N ratio due to a drop-out or the like, because the EXOR 15' receives as its input signal, a rectangular wave signal (k) of 2 H period which is synchronized with the horizontal synchronizing signal. As long as the other input signal (e) of the EXOR 15' and the other input signal (i) of the EXOR 20' are not inverted, the phase of the output signal (n) of the EXOR 20' never becomes discontinuous. Besides, as will be described in detail later, the output signal (e) of the DFF 14' is arranged to be inverted when a preset number of incoming pulses ($2^7$) have been counted by the counter 13' and, in addition to that, the output signal (i) of the EXOR 19' is not inverted when the signal PG is not supplied there. Such being the arrangement, the output signal (n) of the EXOR 20' is never inverted by the drop-out of several H periods.

The operation of the embodiment on the occasion of the inversion of the output signals (e) and (i) of the DFF 14' and the EXOR 19', is as follows: FIG. 5 schematically shows a recording format on a magnet sheet usable for the embodiment. FIGS. 6(a) to 6(e) schematically show signal processing arrangement generally applied to the signal joining parts in the recording format shown in FIG. 5.

Referring to FIG. 5, if one field portion of recorded line sequential color difference signals (as well as a luminance signal) are reproduced as they are, there arises a skew of 0.5 H. As is well known, this can be compensated for by alternately taking out a signal coming through a ½ H delay line and a signal coming not through the delay line for every one field period. Then, a field picture is artificially obtained from such one field portion of the video signal.

Referring to FIGS. 6(a) to 6(e), the fall of the signal PG is arranged to coincide with each signal joining part indicated by a reference symbol C in FIG. 5. In other words, signals which deviate ½ H as shown in FIGS. 6(b) and 6(c) are switched over for every field, as shown in FIGS. 6(d) and 6(e), in obtaining the line sequential color different signals. However, the alternating change in the kind of the color difference signals obtained in this manner, is interrupted at a shift from a first field to a second field as shown in FIG. 6(e) although it is uninterrupted in shifting from the second field to the first as shown in FIG. 6(d). To solve this problem, the phase of the output signal of the EXOR 20' which is used for change-over of the positions of the switches SW1 and SW2, must be made discontinuous.

FIGS. 7(pa) to 7(d) show, in a timing chart, the waveforms at various points (a) to (d) in FIG. 3 which are obtained at the time of field change-over. At the above-stated shifting point from the first field to the second field, the output signal of the EXOR 16 becomes discontinuous. However, the output signal (j) of the EXOR 15' remains continuous. Therefore, the level of the output signal (c) of the EXOR 9' changes to a high level. The output signal (b) of the monostable multivibrator 10' then passes through the AND gate 12' to have the fall thereof counted by the counter 13'. When the counted value of the counter 13' reaches a preset value (128), the counter 13' produces a signal which remains at a high level for one H period as shown in FIG. 7(l). This signal causes the output signal (e) of the DFF 14' to be inverted. The output signal (j) of the EXOR 15' is also inverted. In other words, at this point of time, the output signal of the EXOR 15' also becomes discontinuous to come to coincide with the phase of the output signal of the EXOR 16. Following this, the level of the output of the EXOR 9' changes to a low level and the counting operation of the counter 13' comes to a stop.

Meanwhile, the signal PG (f) is supplied through the terminal 20 to the DFF 16'. The output signal (g) of the DFF 16' is supplied to the DFF's 17' and 18'. Then the output signal (e) of the DFF 14', which is supplied as a data to the DFF 17' to be sampled and held as a data (the Q output of the DFF 17' is delayed by one field length and is further inverted. In other words, a signal (h), which precedes the signal (e) by about 128 H's, is produced from the DFF 18' as a Q output thereof. With the Q output (h) of the DFf 18' thus inverted, the output signal (i) of the EXOR 19' remains at a high level until the Q output (e) of the DFF 14' is inverted. During this period, the output signal (n) of the EXOR 20' is obtained by inverting the output signal (j) of the EXOR 15'.

Thus, even in the event of the discontinued alternation of the line sequential color difference signals arising at the time of shift from the first field to the second, the switches SW1 and SW2 are operated in pursuance thereof. Further, with the exception of that the output of the EXOR 16 and the output (j) of the EXOR 15' fail to coincide with each other while more than 12 H's within 256 H's are counted by the counter 13', the output (h) of the DFF 14' is never inverted. It is, therefore, nearly impossible that the output (n) of the EXOR 20' becomes discontinuous at any point of time other than the shifting point from the first field to the second field. The embodiment thus ensures a satisfactory rearrangement of the line sequential color difference signals into simultaneous signals by virtue of the switches SW1 and SW2 even in cases where the S/N ratio of the line sequential signals is extremely poor.

It is impossible to obtain such a waveform that is shown in FIG. 7(h) by using the signal PG immediately after commencement of reproduction. However, stable line simultaneous color difference signals can be obtained by the above-described operation when the signal PG and the rotation of the magnetic sheet coincide with each other with several frames having been reproduced at the most.

In the apparatus shown in FIG. 3, as described above, the line sequential color difference signals are rearranged into concurrent signals by using two counters on the basis of a majority-deciding-like concept for determining the polarity of a control signal which controls the switches. Therefore, the rearrangement into the concurrent (or simultaneous) signals is never erroneously performed even in the event of a video signal which is very poor in the S/N ratio due to a drop-out or the like.

Further, the embodiment is arranged to detect a point at which the polarity of the control signal for change-over of the rearranging switches becomes discontinuous and further, to make the polarity of the control signal discontinuous by using the signal PG. Therefore, any possible error in the polarity of the control signal is limited to a period during which there exists a phase error between the signal PG obtained for reproduction. This arrangement thus ensures an accurate switch-over operation.

It is possible to have a drop-out detection circuit arranged to mute the input to the counter 13' of FIG. 3 during a drop-out period on the occasion of a drop-out.

The switch 18 determines which of the discrimination signal G and the output of the statistical processing circuit 17 is to be used by the coincidence circuit 19. This switch 18 is connected either to the statistical processing circuit 17 or to the EXOR circuit 16 before completion of the assembly work on the device. Since the statistical processing circuit 17 requires a signal of a stable HD period, the use of the output of the statistical processing circuit 17 should be selected for a system where a stable HD signal is obtainable, irrespective of the presence or absence of a drop-out, by virtue of a so-called AFC circuit.

With the luminance signal received at the terminal 5, when a drop-out is detected by the drop-out detecting circuit 13, the switches 2 and open to prohibit thereby the timing pulses C and D from being supplied to the switch 8 and the DFF 12. In other words, the output of the DFF 12 is fixed as the offset level is not detectable when a drop-out takes place. This arrangement ensures the reliability of the discrimination signal even during a drop-out period.

The arrangement of this embodiment described permits use of CMOS elements for all the parts except the capacitor 6. Therefore, the embodiment is capable of performing a concurrence obtaining process in a reliable manner without necessitating any particularly high degree of precision of a circuit constant and any additional arrangement for adjustment of the circuit constant. Further, this advantage facilitates integration of the circuit, so that the size of the apparatus can be reduced and the electric energy saving can be furthered.

In accordance with this invention, as described in the foregoing, line sequential signals can be adequately rearranged into concurrent signals with simple arrangement of the video signal processing device.

What is claimed is:

1. A video signal processing device, for processing a video signal including line sequential signals which are DC offset during a specific portion of every horizontal scanning period, comprising:
    (a) discrimination signal forming means for forming and outputting a discrimination signal indicating whether a level during a DC offset portion of a line is higher or lower than the level of the DC offset portion of a subsequent line;
    (b) arranging means for arranging said line sequential signal into a line concurrent signal on the basis of the discrimination signal outputted from said discrimination signal forming means;
    (c) dropout detecting means for detecting whether or not a dropout occurs in said video signal; and
    (d) control means for controlling formation of said discrimination signal by said discrimination signal forming means in response to a result of detection of said dropout detecting means.

2. A device according to claim 1, wherein said discrimination signal forming means includes clamping means for clamping said line sequential signal to the level of said line sequential signal during said specific portion of the period.

3. A device according to claim 2, wherein said discrimination signal forming means forms and outputs a binary signal which represents whether the level of the line sequential signal during the portion other than said specific portion of the period is higher or lower than the level during said specific portion, by using the line sequential signal clamped by said clamping means.

4. A device according to claim 3, wherein said discrimination signal forming means further includes amplifying means for amplifying the binary signal outputted from said binary signal forming means.

5. A device according to claim 1, and further comprising:
    rectangular wave signal producing means for producing a rectangular wave signal which reverses for every horizontal scanning period and control means for controlling a polarity of said rectangular wave signal, said arranging means being constructed so as to arrange said line sequential signal into the line concurrent signal on the basis of the rectangular wave signal, the polarity of which is controlled by said control means.

6. A device according to claim 1, wherein said video signal includes a luminance signal and line sequential color difference signals.

7. A device according to claim 6, and further comprising:
    dropout detecting means for detecting a dropout of said luminance signal; and
    control means for controlling formation of the discrimination signal by said discrimination signal forming means in response to an output of said dropout detecting means.

8. A video signal processing device for processing a video signal including line sequential signals which are DC offset during a specific portion of every horizontal scanning period, comprising:
    (a) clamping means for clamping and outputting a line sequential signal to a level of said line sequential signal during a specific portion of a period, for every two horizontal scanning periods;
    (b) binary signal forming means for forming and outputting a binary signal which indicates whether the level of the line sequential signal during a portion other than said specific portion of the period is higher or lower than the level of the line sequential signal during said specific portion of the period;
    (c) arranging means for arranging said line sequential signal into a line concurrent signal, on the basis of the binary signal outputted from said binary signal forming means;
    (d) dropout detecting means for detecting whether or not a dropout occurs in said video signal; and
    (e) reversal inhibiting means for inhibiting reversal of the binary signal outputted from said binary signal forming means depending upon a result of detection effected by said dropout detecting means.

9. A device according to claim 8, wherein said line sequential signals include an R-Y signal and a B-Y signal.

10. A device according to claim 9, and further comprising:
    rectangular wave producing means for producing a rectangular wave signal which reverses for every horizontal scanning period; and
    control means for controlling a polarity of the rectangular wave signal outputted from said rectangular wave producing means, on the basis of the binary signal outputted from said binary signal producing means.

11. A device according to claim 10, and further comprising:

dropout detecting means for detecting a dropout of the luminance signal; and inhibiting means for inhibiting the reversal of the binary signal outputted from said binary signal forming means, depending upon a result of detection effected by said dropout detecting means.

* * * * *